United States Patent
Walker et al.

(10) Patent No.: US 12,367,148 B2
(45) Date of Patent: *Jul. 22, 2025

(54) VARIABLE EXECUTION TIME ATOMIC OPERATIONS

(71) Applicant: Micron Technology, Inc., Boise, ID (US)

(72) Inventors: Dean E. Walker, Allen, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,483

(22) Filed: Mar. 27, 2024

(65) Prior Publication Data

US 2024/0311306 A1 Sep. 19, 2024

Related U.S. Application Data

(63) Continuation of application No. 17/899,184, filed on Aug. 30, 2022, now Pat. No. 11,960,403.

(51) Int. Cl.
*G06F 12/084* (2016.01)

(52) U.S. Cl.
CPC .................. *G06F 12/084* (2013.01)

(58) Field of Classification Search
CPC .................................................... G06F 12/084
See application file for complete search history.

(56) References Cited

U.S. PATENT DOCUMENTS

| | | |
|---|---|---|
| 6,389,517 B1 | 5/2002 | Moudgal et al. |
| 6,438,573 B1 | 8/2002 | Nilsen |
| 8,122,229 B2 | 2/2012 | Wallach et al. |
| 8,156,307 B2 | 4/2012 | Wallach et al. |
| 8,205,066 B2 | 6/2012 | Brewer et al. |
| 8,423,745 B1 | 4/2013 | Brewer |
| 8,561,037 B2 | 10/2013 | Brewer et al. |
| 9,652,385 B1 | 5/2017 | Chadwick et al. |
| 9,710,384 B2 | 7/2017 | Wallach et al. |
| 10,990,391 B2 | 4/2021 | Brewer |
| 10,990,392 B2 | 4/2021 | Brewer |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2015/0046655 A1 | 2/2015 | Nystad et al. |
| 2015/0143350 A1 | 5/2015 | Brewer |
| 2015/0206561 A1 | 7/2015 | Brewer et al. |
| 2018/0032435 A1 | 2/2018 | Parker et al. |
| 2019/0042214 A1 | 2/2019 | Brewer |

(Continued)

FOREIGN PATENT DOCUMENTS

| | | |
|---|---|---|
| CN | 117632790 A | 3/2024 |
| WO | WO-2010051167 A1 | 5/2010 |

(Continued)

*Primary Examiner* — Jason W Blust
(74) *Attorney, Agent, or Firm* — Schwegman Lundberg & Woessner, P.A.

(57) ABSTRACT

System and techniques for variable execution time atomic operations are described herein. When an atomic operation for a memory device is received, the run length of the operation is measured. If the run length is beyond a threshold, a cache line for the operation is locked while the operation runs. A result of the operation is queued until it can be written to the cache line. At that point, the cache line is unlocked.

20 Claims, 10 Drawing Sheets

(56) References Cited

U.S. PATENT DOCUMENTS

| | | |
|---|---|---|
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |
| 2024/0070074 A1 | 2/2024 | Walker et al. |

FOREIGN PATENT DOCUMENTS

| | | |
|---|---|---|
| WO | WO-2013184380 A2 | 12/2013 |
| WO | WO-2019191740 A1 | 10/2019 |
| WO | WO-2019191742 A1 | 10/2019 |
| WO | WO-2019191744 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |

| | | | |
|---|---|---|---|
| 605 | CACHE SET 0 (ADDRESS 00XXXX) | CACHE LINE | WAY 0 TAG + DATA — 625 |
| | | CACHE LINE | WAY 1 TAG + DATA — 630 |
| | | CACHE LINE | WAY 2 TAG + DATA — 635 |
| | | CACHE LINE | WAY 3 TAG + DATA — 640 |
| 610 | CACHE SET 1 (ADDRESS 01XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 615 | CACHE SET 2 (ADDRESS 10XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 620 | CACHE SET 3 (ADDRESS 11XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |

FIG. 6

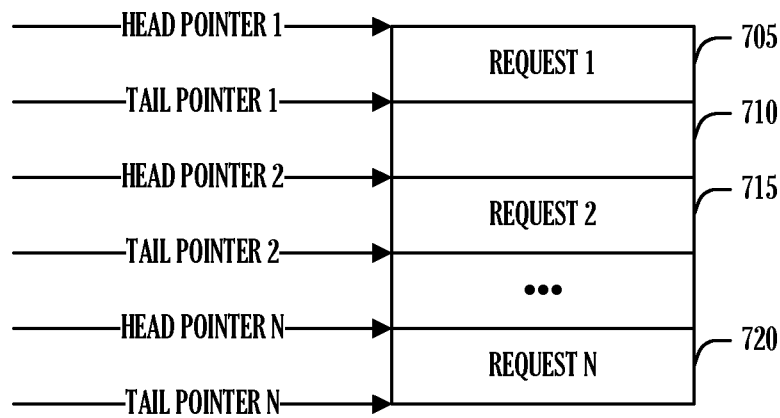
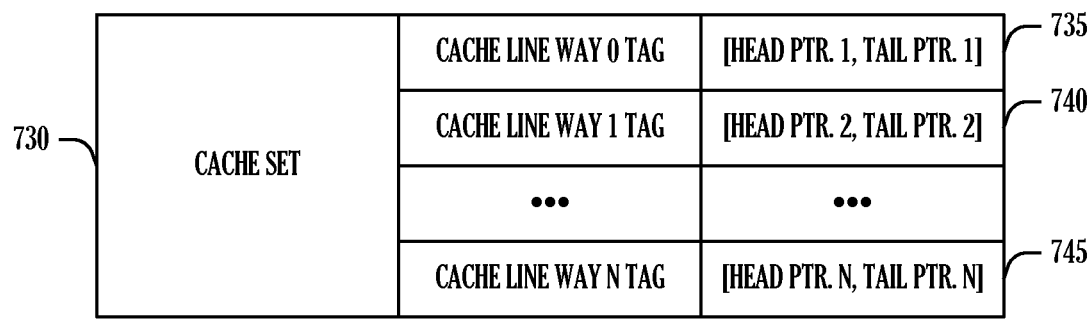
FIG. 7

VARIABLE EXECUTION TIME ATOMIC OPERATIONS

PRIORITY APPLICATION

This application is a continuation of U.S. application Ser. No. 17/899,184, filed Aug. 30, 2022, which is incorporated herein by reference in its enirety.

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to variable execution time atomic operations .

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 6 illustrates an example of an associative cache, according to an embodiment.

FIG. 7 illustrates an example of a memory including several cache way defer queues and cache tags pointing to the defer queues, according to an embodiment.

DETAILED DESCRIPTION

Figure 1:
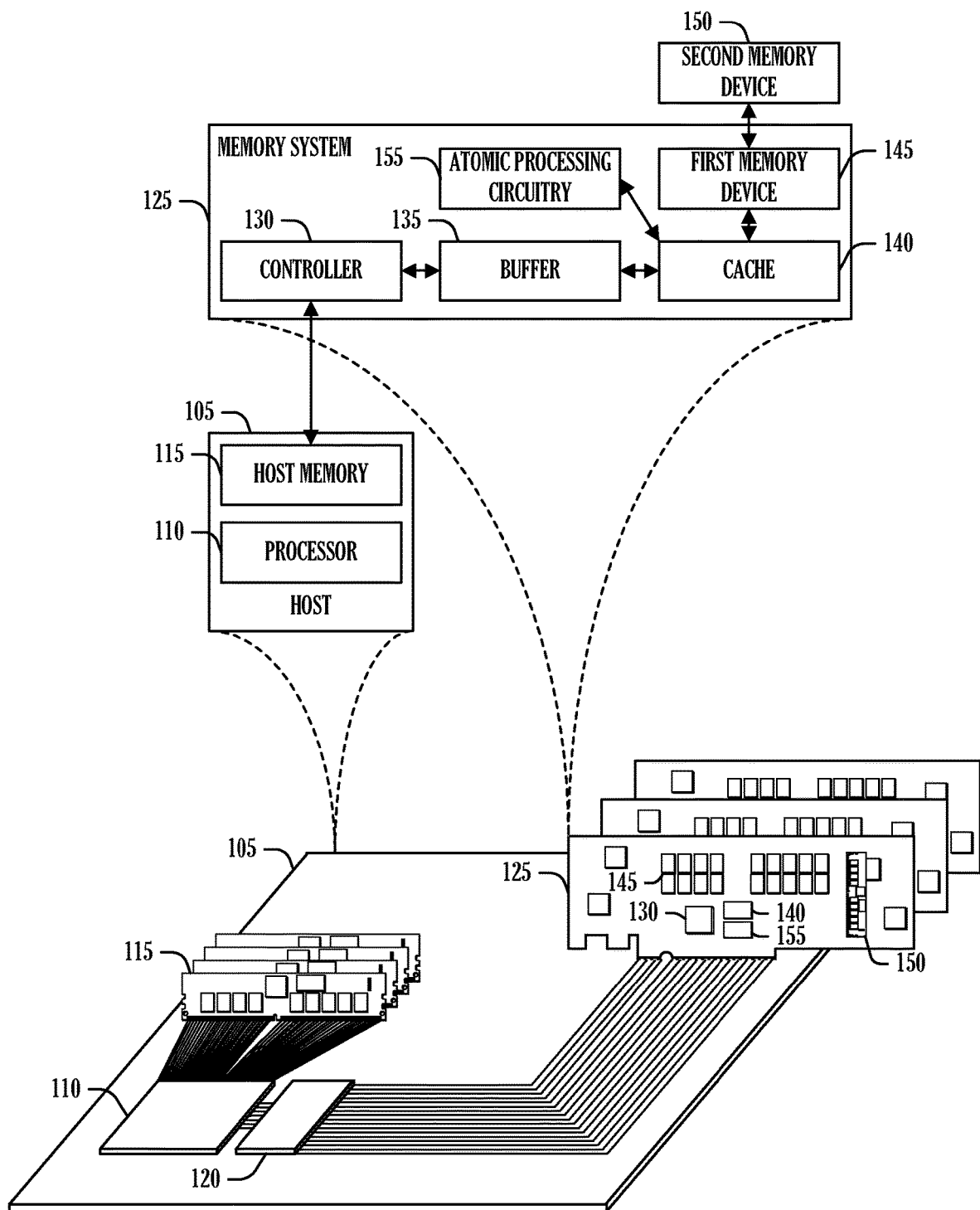
FIG. 1 illustrates an example of an environment including a system for variable execution time atomic operations, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. An atomic memory unit (AMU) is a type of acceleration performing atomic memory operations (AMOs). An AMO is an extension to ordinary memory operations such as reads and writes. An AMO request typically specifies the specific AMO and one or more memory addresses upon which the AMO operates. For example, the AMO can be a plus-one operation. Here, the address holds a number. When it executes, the memory line is loaded into a cache line, the number from the cache line is provided to the accelerator where a one is added to the number to produce the result, and the result is written back to the cache line. The AMO is atomic because there is no ability to change the memory line between the beginning and end of the AMO execution. AMOs can be "built-in," referring to hardwired circuitry to perform the AMO in the accelerator. AMOs can also be programmable, whereby the accelerator includes processing circuitry that is configured by software to perform the AMO.

The complexity of computation in AMOs can be variable. Run-time is one way to consider this complexity rather than a number of computations. Thus, if an AMO can complete five calculations in a single clock cycle due to the design of the accelerator, this AMO can be considered to have the same complexity as a single calculation AMO that also completes in a single clock cycle. Although the number of calculations can drive concepts of complexity with respect to circuit design, with respect to operational complexity, the run-time complexity can be more useful. As used herein, AMOs with a run-time beyond a threshold are "long AMOs." Other AMOs can be called "short AMOs." In an example, the threshold is a single clock cycle. Short AMOs can also be called "low-latency" or "in-line" while the long AMOs can be called "high-latency," "higher-latency," or "extended" AMOs.

Generally, the memory controller, and memory side cache, are configured to process single cycle operations. Thus, short AMOs are more easily accommodated by the memory controller and cache. Also, for performance reasons, including cache management efficiency, short, or single cycle, AMOs are preferred. However, at a high Fmax—the maximum frequency at which a digital circuit can operate—it can be difficult for all AMOs to be performed in a single cycle. Floating point AMOs can be an example in which single clock completion can be difficult. Accordingly, there can be issues with the CXL device designs that cannot address long AMOs alongside short AMOs.

To address the issue of implementing both short and long AMOs in the same memory side cache—e.g., using both inline AMOs and extended AMOs to enable the best performance for simple integer atomic operations that can complete in a single data-cache access, while still allowing for other longer latency atomics in the same memory side cache—AMOs are evaluated to determine whether they are short or long. If short, the AMO is processed like other memory operations. However, if the AMO is long, the cache line can be locked while awaiting the result of the long AMO. A results queue is used to hold long AMO results. Once complete, the long AMO result can be written to the cache line, unlocking that cache line. The inclusion of the results queue provides a working area for the long AMOs that enables the long AMOs to execute outside of the traditional memory request pipeline until the results are ready. This additional technique, however, is avoided for short AMOs, enabling both types of AMOs to operate efficiently in the memory side cache. Additional details and examples are provided below.

FIG. 1 illustrates an example of an environment including a system for variable execution time atomic operations, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 6 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following operations are described as be implemented by the controller 130 for the sake of simplicity. However, the cache 140 can include circuitry to perform some or all of these operations. The controller 130 is configured to prioritize external (e.g., host requests, CXL memory requests, etc.) over internal requests (e.g., accelerator requests) via a queueing system that differentiates between the two types of requests. Specifically, the controller 130 is configured to maintain separate external request queues and internal request queues. Prioritization is given to the external request queue without complicated operation analysis or priority logic. FIG. 3, FIG. 4, FIG. 7, and FIG. 8 illustrate various aspects of this multi queue system. In short, when a request is received, a determination is made as to whether the address in the request maps to a current way of a cache set. Because a cache set represents a range of address well beyond the number of ways, it is possible that the memory address of the request does not map to a current way. If the request maps to a current way, and the way is not busy, then the request is executed. If the way is busy, the request is placed into one of two a cache way queues for that way; either the cache way external queue if the request is an external request or the cache way internal queue if the request is an internal request. As the way becomes free (e.g., not busy because a previous request completes), a next request from the cache way queue is popped to execute on the way. Generally, the cache way external queue is emptied before a next request from the cache way internal queue is popped, thus ensuring that no internal request blocks forward progress of the external requests.

If there is no current way that matches the request, then the request is placed in the cache set external queue or the cache set internal queue depending on whether the request is an external request or an internal request. Usually, once a way is free (e.g., not busy and with empty cache way queues), the way can be evicted and a next request from the cache set queue—again, usually the cache set external queue first—popped. The memory line corresponding to the newly popped request is loaded into a way and the request can execute. In this manner, proper execution order and blocking given the priority of external requests over internal requests can be maintained.

To provide for variable execution time AMOs, the controller 130 (or the cache 140) includes a results queue and circuitry to evaluate the run length of an AMO. Thus, the controller 130 is configured to receive an AMO and evaluate the run length of the atomic operation. In an example, the evaluated run length is compared to a threshold to classify the AMO as a short AMO to a long AMO. Thus, if the run length is beyond the threshold, the AMO is a long AMO. Otherwise, the AMO is a short AMO. The run length can involve different metrics, such as execution time. In an example, the run length is measured in clock cycles. In an example, the threshold is a single clock cycle. The evaluation of the run length can take several forms. For example, the AMO can include a run length field. In an example, the run length is determined by a lookup table or the like based on the name of the AMO. In an example, the run length is determined by a type of AMO (e.g., integer operation or floating point operation). In an example, the run length is determined by a current workload on the AMU. Here, an AMO that could execute in a single cycle can be a long AMO when the arithmetic logic unit (ALU) in the accelerator that will perform the AMO is busy for one or more clock cycles when the AMO is received.

When the AMO is a long AMO, the controller 130 is configured to lock the cache way implicated by the AMO. The locking of the cache way operates similarly to the busy signal on the cache way while a read or write to the backing memory occurs and prevents the use of the cache way while the long AMO is executing. In an example, to implement the lock on the cache way, the controller 130 is configured to write an indication in the way tag that an AMO is pending on the way. The indication can be a bit, a field, or other writing that can be read to determine that the way is currently being used. In an example, the indication is a bit at an index that corresponds to a pending AMO. Thus, the fourth bit in the way tag can correspond to any pending AMO, and the fourth bit is set to a logical one to indicate that there is a current pending AMO.

The controller 130 is configured to enqueue (e.g., store) the result of the long AMO into the results queue after the long AMO executes. To manage the design complexity of the controller, the results queue is a finite resource. Thus, there can be a situation in which more long AMOs are requested than can be handled by the results. Queue. To prevent this situation, a credit based system can be employed. In a credit system, a set number of credits exist. When a request is made, a credit is removed from a pool. When a request completes, the credit is returned to the pool. When there are no credits in the pool, a request that is not already given a credit cannot execute. These denied requests can simply fail, letting the requester retry at a later date, or can be deferred, much like other memory requests can be deferred. If, at a later date, the request is re-presented (e.g., by the requester or dequeued from a defer queue), a credit is available, then the long AMO can execute.

In an example, an arbiter (e.g., arbiter circuitry) of the results queue is used to manage the credit pool. Considering the current example, a credit is obtained from the arbiter circuitry for the long AMO. The AMO then executes, to produce the result enqueued in the results queue, in response to receiving the credit. In an example, the credit is returned to the arbiter upon receipt of the results after dequeuing from the results queue. Here, the credit is maintained by the AMO after execution is complete because the results of the AMO are still consuming the resources of the results queue. Only when the result reaches the top of the results queue and is removed is the credit returned, enabling another long AMO to use an entry in the results queue. In an example, the total credits available from the arbiter are equal to a number of entries available in the results queue.

In the credit example, above, running out of credits results in an inability to process additional atomic operations. Thus, in an example, when a second long AMO is received, an attempt to obtain another credit is made for the second AMO before execution of the second AMO by the controller 130. When a credit becomes available, the second AMO can execute. Prior to that time, the controller 130 is configured to hold (e.g., defer) the second AMO.

Once the result of the long AMO reaches the head of the results queue, the controller 130 is configured to pop the result—or accept the result from the result queue—and write the result to the locked cache way. The controller 130 is configured to then unlock the cache way. At this point, the cache way is in a state as if the long AMO were a short AMO; unlocked and holding the result of the long AMO.

When the AMO is a short AMO—e.g., the controller 130 evaluation of the run length of a second AMO determines that the run length is below the threshold—the controller 130 is configured to execute the short AMO without locking the cache way or interacting with the results queue. Essentially, the short AMO will complete before another activity has a chance to use the cache way. Thus, the locking is not necessary and wasteful. Also, the short AMO can execute without consideration of the results queue resources, so no interaction with the credit system of the results queue is required. Once the result of the short AMO is produced, the controller 130 is configured to write the result directly to the cache way. These techniques enable the execution of long AMOs without sacrificing the efficiency of processing short AMOs by the controller 130.

Figure 2:
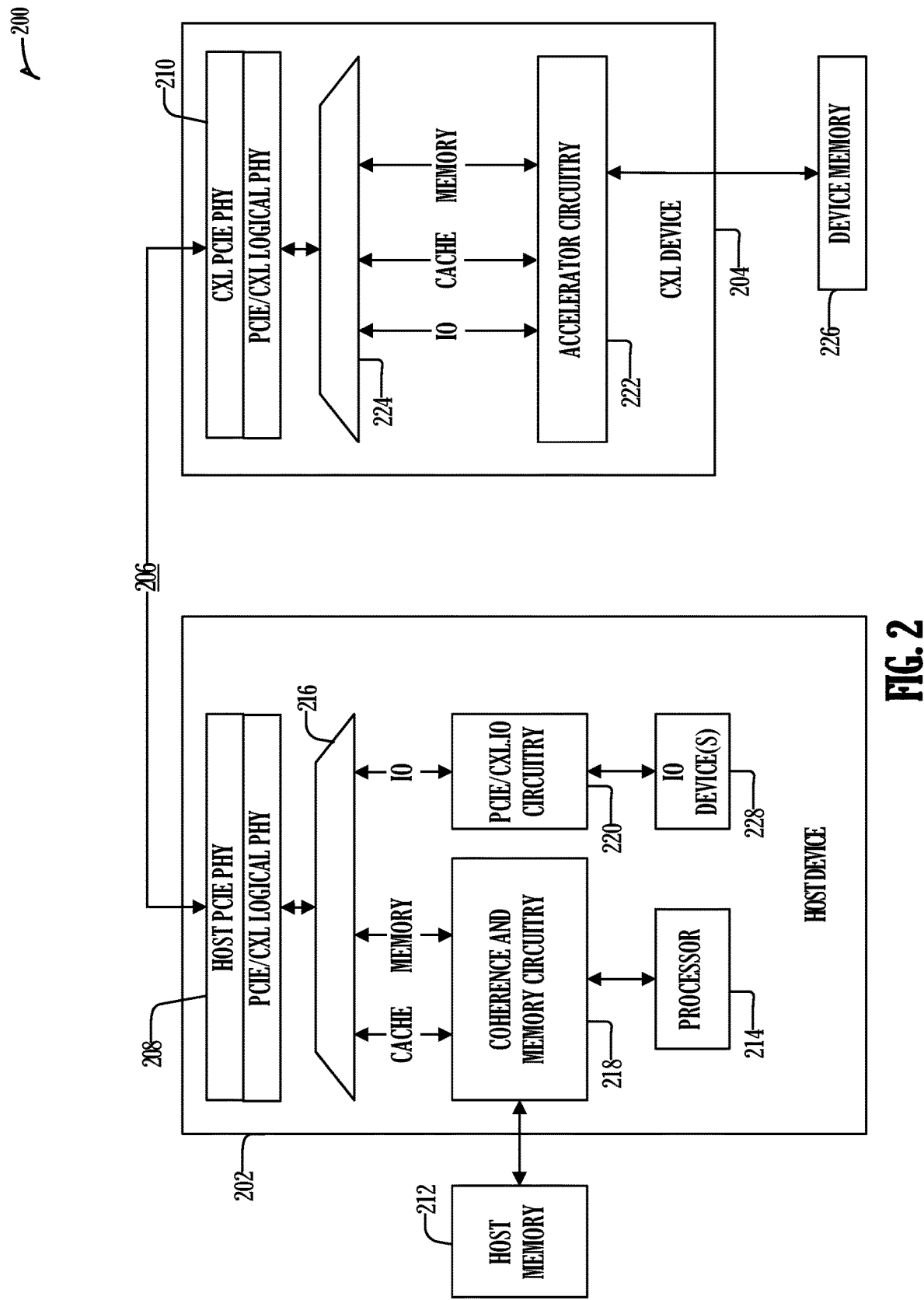
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL-.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL-.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics.

The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
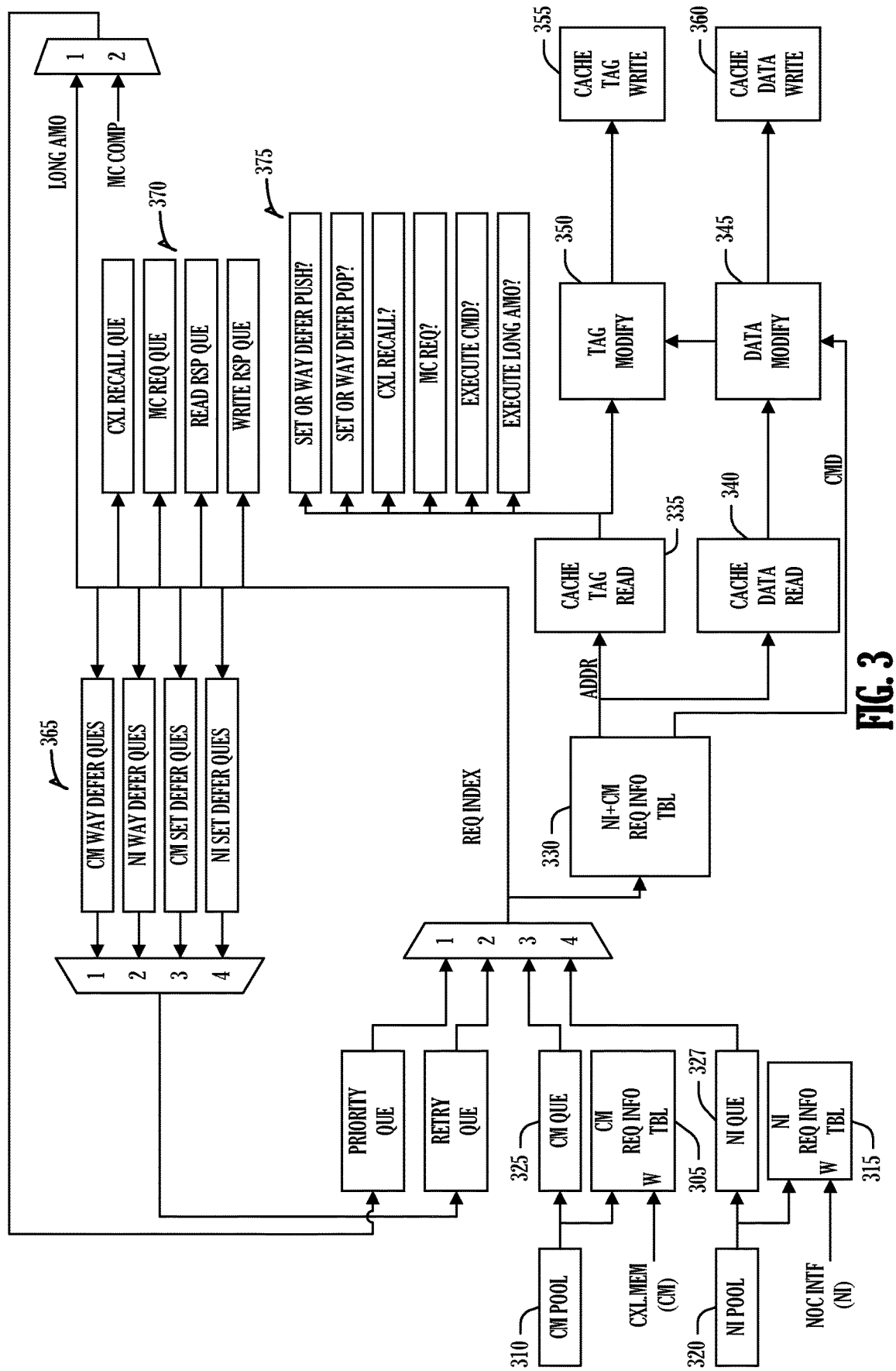
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 327 to ensure forward progress of the CM requests. In an example, as illustrated, when a request is selected from either the CM queue 325 or the NI queue 327, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

Figure 4:
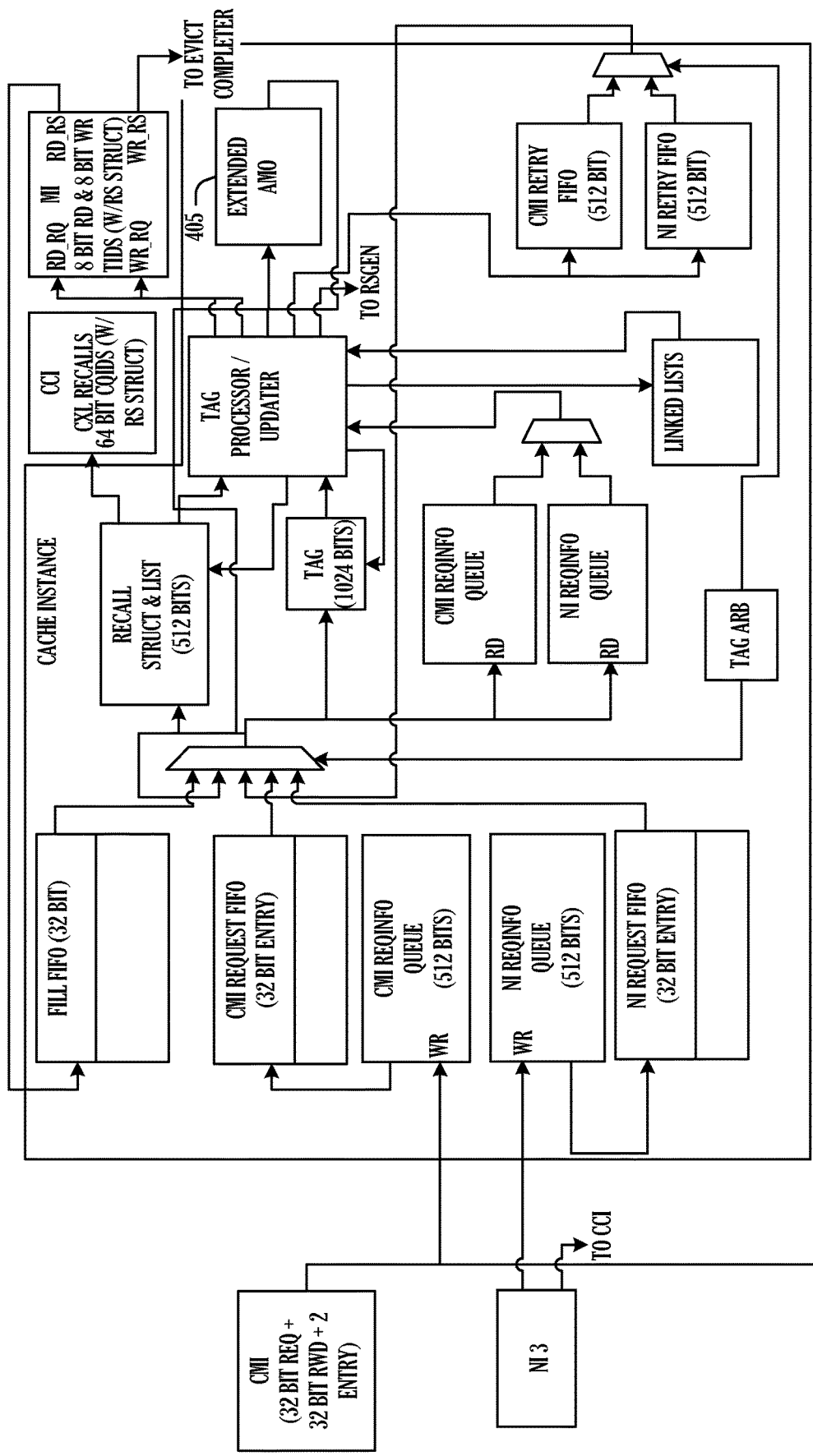
FIG. 4 illustrates example components of a cache, according to an embodiment.
Figure 5:
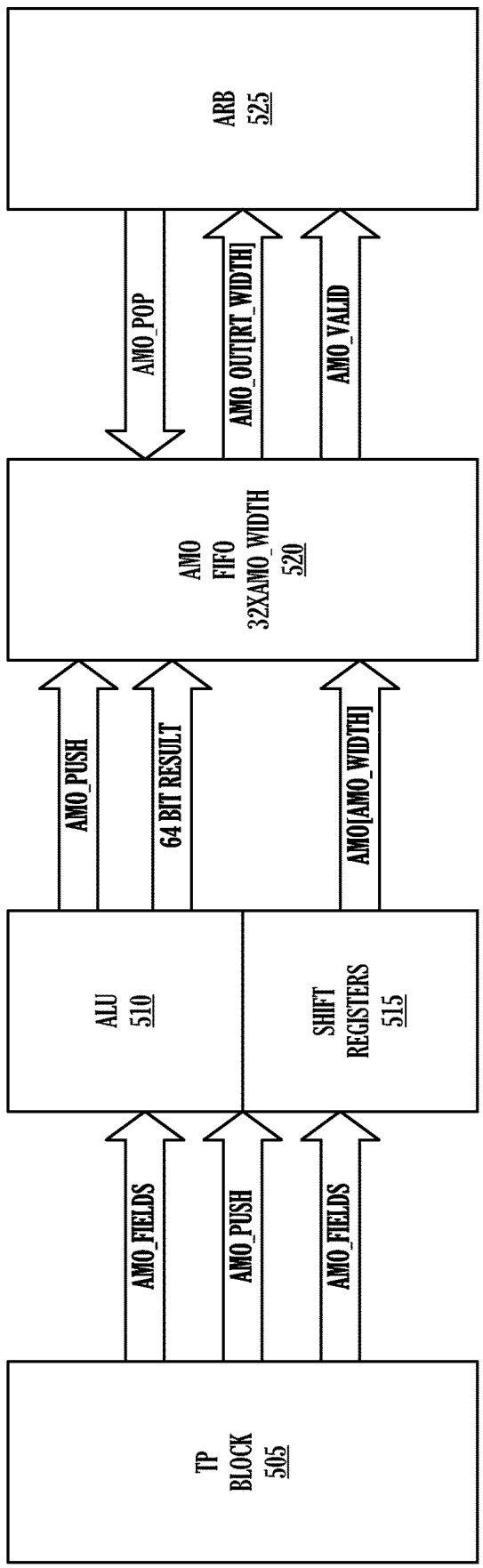
FIG. 5 illustrates an example atomic memory operation circuitry, according to an embodiment.

FIG. 4 illustrates example components of a cache, according to an embodiment. The components generally follow the function of those illustrated in FIG. 3. Here, there are a few differences, such as the illustration of the request information (REQINFO) queues rather than the combined NI+CM Request Information Table 330, or a linked list memory rather than the Set or Way Defer Push and Pop 375. However, also illustrated here, is the extended AMO circuitry 405. The extended AMO circuitry 405 is used to perform long-lived AMOs and the TAG ARB determines the length of an AMO and credit availability for long AMOs before dispatching the long-lived AMOs. Here, a long-AMO is greater than one clock cycle. Thus, a long-AMO will not complete (e.g., provide a response) in less than two clock cycles. AMOs that are not long-AMOs can be called standard AMOs and are expected to provide a result on the next clock cycle. FIG. 5 illustrates an example of the extended AMO circuitry 405.

FIG. 5 illustrates an example atomic memory operation circuitry, according to an embodiment. As illustrated, the AMO circuitry includes a transaction processing (TP) block 505 that feed an ALU 510 and registers 515. The output of the ALU 510 or registers 515 feeds an AMO first-in-first-out (FIFO) 520, or queue, that interacts with the credit arbiter 525. The AMO FIFO is a version of the results queue discussed with respect to FIG. 1.

An AMO is decoded, and a memory operation type is determined. The type is then classified such that single cycle capable AMOs are inline AMOs (e.g., short AMOs), and multi-cycle AMOs are extended AMOs (e.g., long AMOs). In general, inline AMOs modify the data read from the data-cache and write the modified data back into the data-cache on the following clock cycle. Thus, the output of the AMU (e.g., the TP block 505, the ALU 510, or the registers 515) for an in-line AMO is written directly to the cache rather than to the AMO FIFO 520.

The extended AMOs set an "AMO-pending" bit in the tag-cache. This bit prevents any other operation from having access to the cache-way. The following table is an example of this indication in the tag-cache:

| Field Name | bits | Field LSB | Description |
|---|---|---|---|
| retry_pend | 1 | 57 | Retry pending for this cache way - set on pop of a CMI or NI linked list or extended AMO read; cleared by tag processor when retry request or extended AMO write are processed |

During the same cache access, the data read from the data-cache, along with the AMO opcode, are forwarded to the AMU (e.g., the ALU 510 and the registers 515). The AMU performs the extended AMO operation—taking multiple cycles for the operation to complete—and pushes the result into the AMO FIFO 520.

In an example, when the extended AMO result wins arbitration from the AMO FIFO 520 for cache access, the extended AMO result is merged with data read from the data-cache and the modified data is written back into the data-cache on the following cycle. During the same cache access, the tag-cache "AMO-pending" bit is cleared.

To prevent a potential overflow of the AMO FIFO 520, the arbiter 525 uses credits to track outstanding extended AMOs. Each entry in the AMO request queue represents one credit. When an extended AMO result is popped (e.g., dequeued) from the Amo FIFO 520, then a credit is returned to the credit pool. The arbiter 525 only enables extended AMOs to start when a credit is available.

In the AMU, from the TP block 505, there can be read_data[63:0], and opcode within the AMO bus. Here, the full AMO bus isn't pushed into the AMO FIFO 520. Rather, the extended AMO operation, using the read_data, atomic_data and opcode, occurs first. The 64-bit result of the ALU 510 can then be pushed into the AMO FIFO 520, along with the read_data[63:0], the 10-bit cache index, the 9-bit reginfo pointer, and the size and address, which can all come from the latency aligning SHIFTER REGISTERS 515.

FIG. 6 illustrates an example of an associative cache 600, according to an embodiment. Here, the associative cache 600 includes four cache sets, cache set zero 605, cache set one 610, cache set two 615, and cache set three 620. Note that each cache set corresponds to a memory address range. Thus, cache set one corresponds to all memory elements with an address prefixed by 00 while cache set three 615 corresponds to all memory elements with an address prefixed by 10. The cache lines within each cache set represent a storage element (e.g., register) sized for an element in the memory. Each cache line can also be called a "way." Thus, as illustrated, the associated cache 600 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 600 can maintain metadata for the ways. Thus, as illustrated, the associative cache 600 includes a tag (e.g., metadata) in addition to the way data, resulting in the way zero tag and data 625, the way one tag and data 630, the way two tag and data 635, and the way three tag and data 640. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool              m_bRetryPend;
    uint32_t          m_evHashMask;
    SimCount          m_evRecallCnt;
    SimMscReqList     m_niDeferList;
    SimMscReqList     m_cmDeferList;
};
```

The following is an example of a data structure (e.g., C-style struct) to hold tag data for a given way in a cache set:

```
struct MscWay {
    struct MscWayTag {
        uint64_t          m_addr;
        std::bitset       m_validMask;
        std::bitset       m_dirtyMask;
        std::bitset       m_mBusyMask;
        bool              m_bRetryPend;
        bool              m_bRecallPend;
        uint16_t          m_recallRid;
        MetaState         m_memMetaState;
        MetaState         m_curMetaState;
        SimMscReqList     m_niDeferList;
        SimMscReqList     m_cmDeferList;
    } m_tag;
    uint8_t[64]       m_data;
};
```

FIG. 7 illustrates an example of a memory 700 including several cache way defer queues and cache tags 725 pointing to the defer queues, according to an embodiment. As illustrated, the memory 700 is used to implement several queues. The queues each occupy a contiguous range of the memory 700, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 730, the way zero tag 735 maintains the head and tail pointer for the queue 705 (illustrated as holding request one). The empty entry 710 is part of the contiguous memory range corresponding to the queue 705. Thus, if a second request were enqueue, the tail pointer would be moved to the entry 710. Similarly, the way one tag 740 holds the head and tail pointer for the queue 715, and the way N tag 745 maintains the head and tail pointer for the queue 720.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

Figure 8:
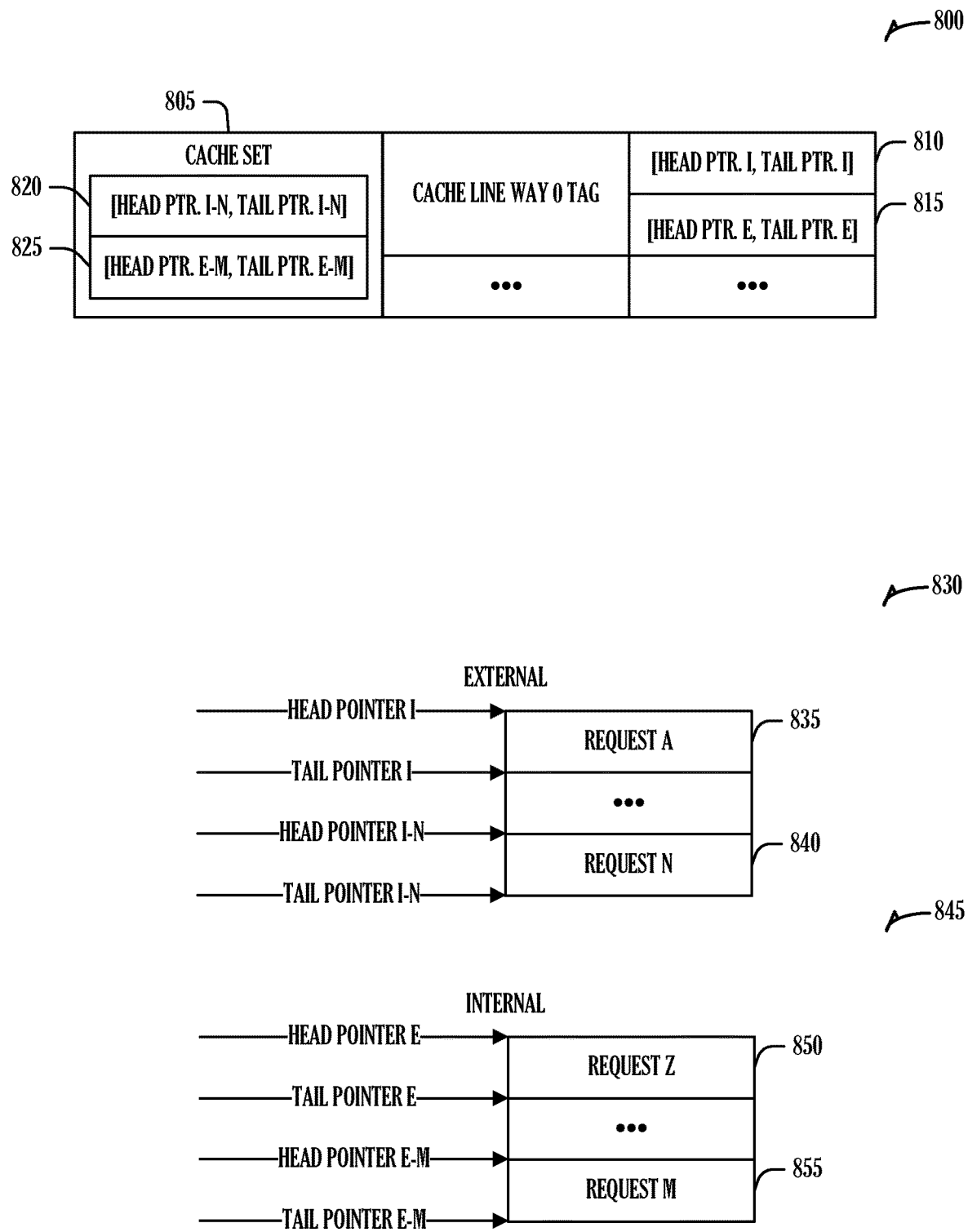
FIG. 8 illustrates an example of a cache set reference to cache-set defer queues divided by which interface requests were received, according to an embodiment.

FIG. 8 illustrates an example of a cache set reference 800 to cache-set defer queues divided by which interface requests were received, according to an embodiment. Specifically, the external defer queues 830 hold requests, or identifiers of requests, for CM requests and the internal defer queues 845 hold NI requests. FIG. 8 differs from the arrangement illustrated in FIG. 7 by separating the queues between the external queues 830 and the internal queues 845. Thus, the way zero tag data includes a field 810 storing the head and pointer for external queue 835 as well as the field 815 for the head pointer of the internal queue 850.

Another difference from the arrangement illustrated in FIG. 7 includes the inclusion of the field 820 and field 825 in the cache set 805. Here, the field 820 holds a head and tail pointer for an external queue of the cache set 805 and the field 825 holds a head and tail pointer for an internal queue of the cache set 805. As described above, if a way is instantiated for an address in the request, but the way is busy, the request is deferred into the appropriate defer queue for the way. Thus, if the request A is an external request and has an address that corresponds to the current way zero, but way zero is busy, then request A is enqueued into the queue 835 for the way zero. However, if there is no way that corresponds to the address in the request, then the request is deferred at the cache set level. Accordingly, because request M is an internal request with an address that does not match any current way—and all ways are busy—the request M is deferred by being placed on the internal defer queue 855. Similarly, external request N is deferred at the cache set level in queue 840 for similarly reasons given for request M.

Figure 9:
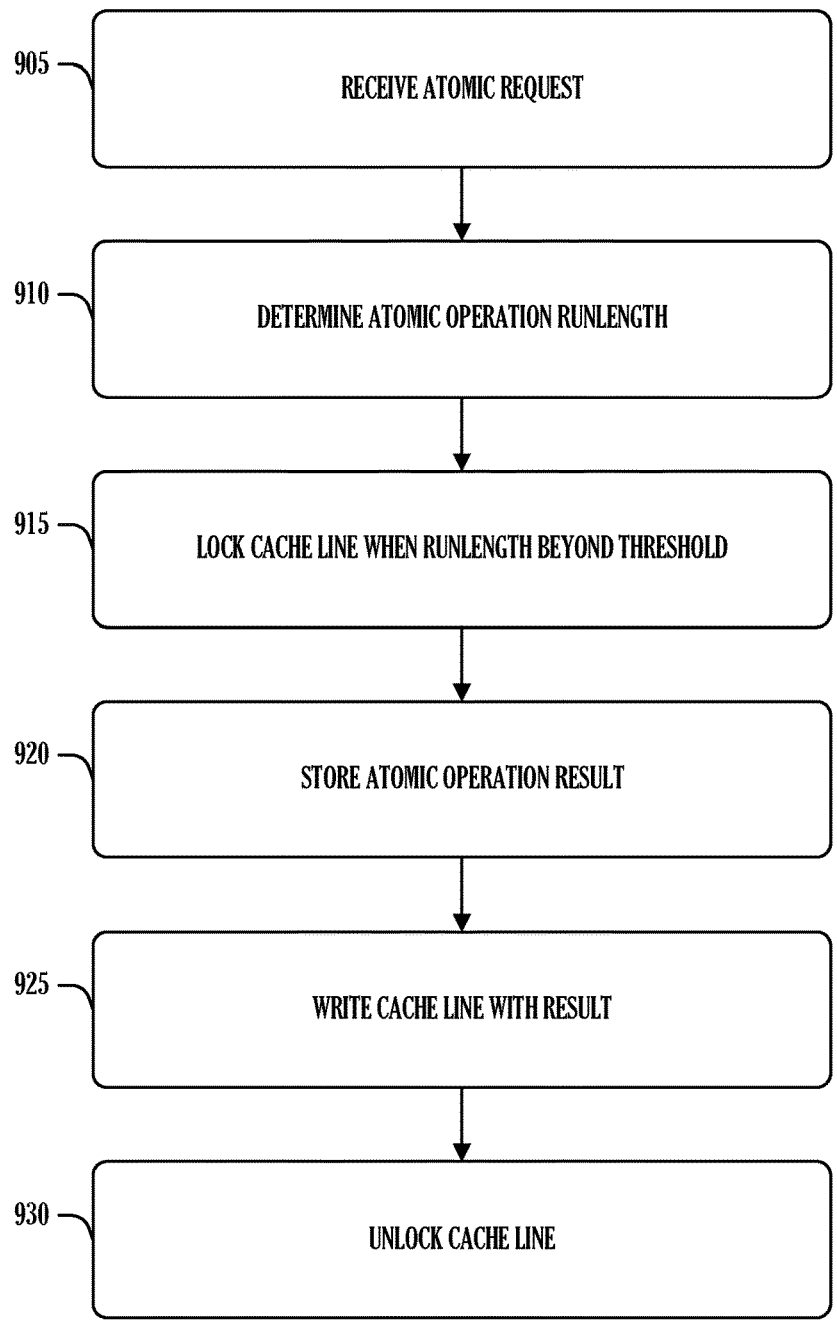
FIG. 9 illustrates a flow diagram of an example of a method for variable execution time atomic operations, according to an embodiment.

FIG. 9 illustrates a flow diagram of an example of a method 900 for variable execution time atomic operations, according to an embodiment. The operations of the method 900 are performed by computational hardware, such as that described above or below (e.g., processing circuitry).

At operation 905, an atomic operation is received (e.g., at a memory device). Here, the atomic operation corresponds to an operation to be performed on memory in the memory device.

At operation 910, the run length of the atomic operation is evaluated to detect whether the run length is beyond a threshold. In an example, the run length is measured in clock cycles. In an example, the threshold is a single clock cycle.

At operation 915, a cache line for the memory is locked in response to detecting that the run length is beyond the threshold. In an example, locking the cache line includes setting a tag for the cache line. In an example, the tag indicates that an atomic operation is pending. In an example, the tag is a bit at an index that corresponds to a pending atomic operation.

At operation 920, a result of the atomic operation is enqueued in a results queue. To manage the results queue (e.g., to prevent the results queue from filling) a credit based system can be employed. Here, a finite number of credits, which correspond to the capacity of the results queue, are used. When an atomic operation is presented for execution, a credit is given to the operation. When the operation completes, the credit is returned. Thus, if the capacity of the results queue is full, there is no credit to give to a next presented atomic operation until an in-flight operation completes. The following operations illustrate this example. Considering the current example, a credit is obtained (e.g., from arbiter circuitry of the results queue) for the atomic operation. The atomic operation then executes, to produce the result enqueued in the results queue, in response to receiving the credit. In an example, the credit is returned to the arbiter upon receipt of the results after dequeuing from the results queue. In an example, the total credits available from the arbiter are equal to a number of entries available in the results queue.

In the credit example, above, running out of credits results in an inability to process additional atomic operations. Thus, in an example, when a second atomic operation is received—and the run length of the second atomic operation is beyond the threshold—an attempt to obtain another credit is made for the second atomic operation. Execution of the second atomic operation will not begin until the second credit is obtained.

At operation 925, the cache line is written with the result in response to dequeuing the result from the results queue.

At operation 930, the cache line is unlocked in response to writing the cache line with the result.

The following operations of the method 900 follow an example when the atomic operation has a run length less that the threshold of operation 910. Thus, a second atomic operation can be received and a run length for the second operation evaluated. The second atomic operation can be executed, when the run length of the second operation is not beyond the threshold, to produce a second result. The the second result can be written to the cache line without locking the cache line during the execution of the second atomic operation or during the writing of the second result to the cache line.

Figure 10:
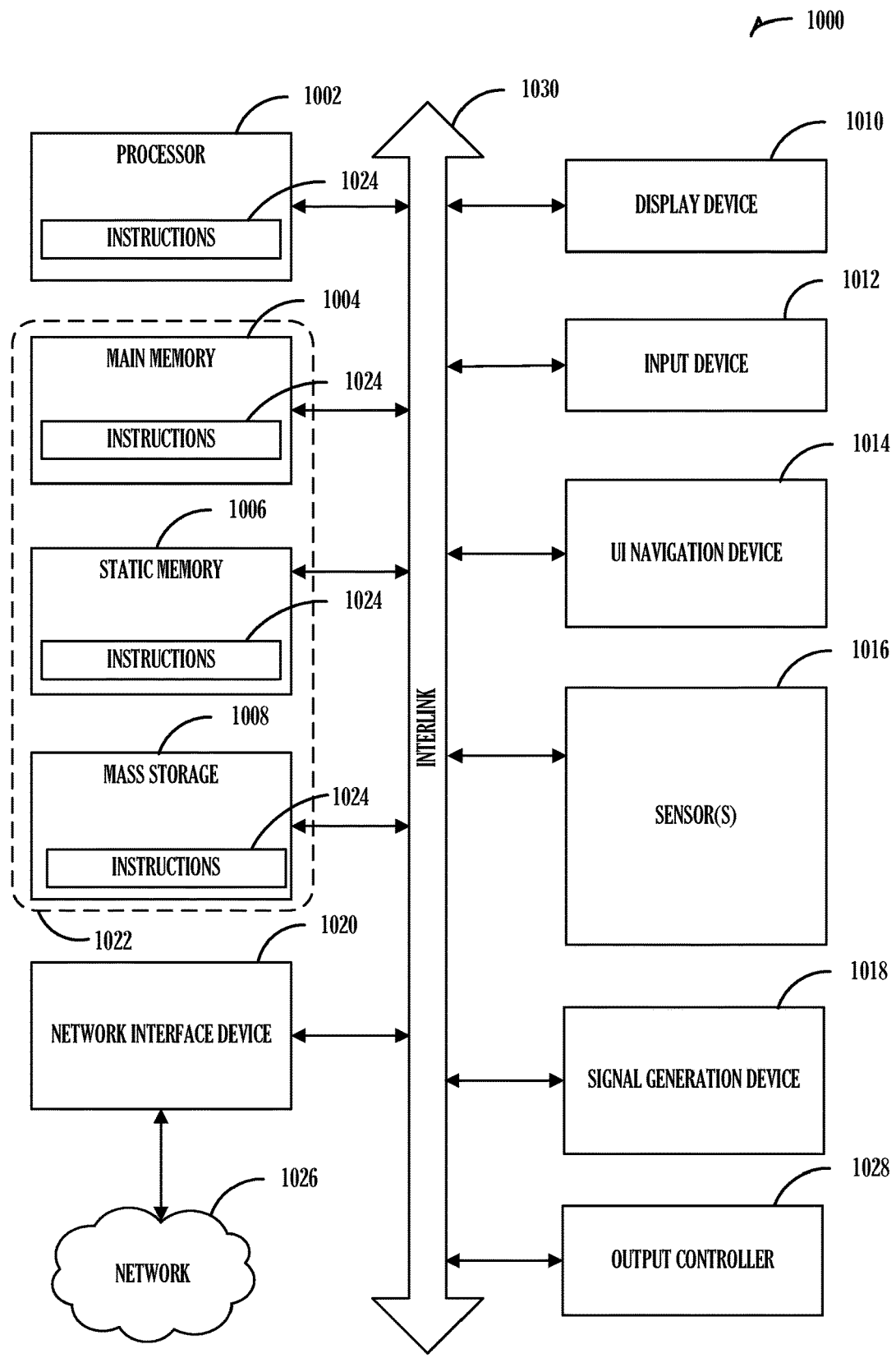
FIG. 10 illustrates an example of a machine with which one or more embodiments can be implemented.

FIG. 10 illustrates a block diagram of an example machine 1000 with which any one or more of the techniques (e.g., methodologies) discussed herein can perform. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 can constitute the machine readable media 1022. While the machine readable medium 1022 is illustrated as a single medium, the term "machine readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine readable medium 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

Additional Notes & Examples

Example 1 is an apparatus for variable execution time atomic operations, the apparatus comprising: a cache including a cache line; processing circuitry configured to: receive an atomic operation that corresponds to an operation to be performed on memory in the apparatus; detect that a run length of the atomic operation beyond a threshold; lock the cache line for the memory in response to detecting that the run length is beyond the threshold; enqueue a result of the atomic operation in a results queue; write the cache line with the result in response to dequeuing the result from the results queue; and unlock the cache line in response to writing the cache line with the result.

In Example 2, the subject matter of Example 1, wherein, to lock the cache line, the processing circuitry is configured to set a tag for the cache line.

In Example 3, the subject matter of Example 2, wherein the tag indicates that an atomic operation is pending.

In Example 4, the subject matter of Example 3, wherein the tag is a bit at an index that corresponds to a pending atomic operation.

In Example 5, the subject matter of any of Examples 1-4, wherein the run length is measured in clock cycles.

In Example 6, the subject matter of Example 5, wherein the threshold is a single clock cycle.

In Example 7, the subject matter of any of Examples 1-6, wherein the processing circuitry is configured to: receive a second atomic operation at the apparatus; detect that a second run length of the second atomic operation is not beyond the threshold; execute the second atomic operation to produce a second result; and write the second result to the cache line, wherein the cache line is not locked during execution of the second atomic operation or writing of the second result to the cache line.

In Example 8, the subject matter of any of Examples 1-7, wherein the processing circuitry is configured to: obtain a credit from an arbiter of the results queue; and execute, in response to receiving the credit, the atomic operation to produce the result.

In Example 9, the subject matter of Example 8, wherein the processing circuitry is configured to: receive a second atomic operation at the apparatus; detect that a second run length of the second atomic operation is beyond the threshold; attempt to receive a second credit from the arbiter for the second atomic operation; and refrain from starting execution of the second atomic operation upon failing to obtain the second credit from the arbiter.

In Example 10, the subject matter of any of Examples 8-9, wherein total credits available from the arbiter are equal to a number of entries available in the results queue.

In Example 11, the subject matter of any of Examples 8-10, wherein the processing circuitry is configured to return the credit to the arbiter upon receipt of the results after dequeuing from the results queue.

Example 12 is a method for variable execution time atomic operations, the method comprising: receiving an atomic operation at a memory device, the atomic operation corresponding to an operation to be performed on memory in the memory device; detecting that a run length of the atomic operation beyond a threshold; locking a cache line for the memory in response to detecting that the run length is beyond the threshold; enqueueing a result of the atomic operation in a results queue; writing the cache line with the result in response to dequeuing the result from the results queue; and unlocking the cache line in response to writing the cache line with the result.

In Example 13, the subject matter of Example 12, wherein locking the cache line includes setting a tag for the cache line.

In Example 14, the subject matter of Example 13, wherein the tag indicates that an atomic operation is pending.

In Example 15, the subject matter of Example 14, wherein the tag is a bit at an index that corresponds to a pending atomic operation.

In Example 16, the subject matter of any of Examples 12-15, wherein the run length is measured in clock cycles.

In Example 17, the subject matter of Example 16, wherein the threshold is a single clock cycle.

In Example 18, the subject matter of any of Examples 12-17, comprising: receiving a second atomic operation at the memory device; detecting that a second run length of the second atomic operation is not beyond the threshold; executing the second atomic operation to produce a second result; and writing the second result to the cache line, wherein the cache line is not locked during execution of the second atomic operation or writing of the second result to the cache line.

In Example 19, the subject matter of any of Examples 12-18, comprising: obtaining a credit from an arbiter of the results queue; and executing, in response to receiving the credit, the atomic operation to produce the result.

In Example 20, the subject matter of Example 19, comprising: receiving a second atomic operation at the memory device; detecting that a second run length of the second atomic operation is beyond the threshold; attempting to receive a second credit from the arbiter for the second atomic operation; and refraining from starting execution of the second atomic operation upon failing to obtain the second credit from the arbiter.

In Example 21, the subject matter of any of Examples 19-20, wherein total credits available from the arbiter are equal to a number of entries available in the results queue.

In Example 22, the subject matter of any of Examples 19-21, comprising returning the credit to the arbiter upon receipt of the results after dequeuing from the results queue.

Example 23 is a machine readable medium including instructions for variable execution time atomic operations, the instructions, when executed by processing circuitry cause the processing circuitry to perform operations comprising: receiving an atomic operation at a memory device, the atomic operation corresponding to an operation to be performed on memory in the memory device; detecting that a run length of the atomic operation beyond a threshold; locking a cache line for the memory in response to detecting that the run length is beyond the threshold; enqueueing a result of the atomic operation in a results queue; writing the cache line with the result in response to dequeuing the result from the results queue; and unlocking the cache line in response to writing the cache line with the result.

In Example 24, the subject matter of Example 23, wherein locking the cache line includes setting a tag for the cache line.

In Example 25, the subject matter of Example 24, wherein the tag indicates that an atomic operation is pending.

In Example 26, the subject matter of Example 25, wherein the tag is a bit at an index that corresponds to a pending atomic operation.

In Example 27, the subject matter of any of Examples 23-26, wherein the run length is measured in clock cycles.

In Example 28, the subject matter of Example 27, wherein the threshold is a single clock cycle.

In Example 29, the subject matter of any of Examples 23-28, wherein the operations comprise: receiving a second atomic operation at the memory device; detecting that a second run length of the second atomic operation is not beyond the threshold; executing the second atomic operation to produce a second result; and writing the second result to the cache line, wherein the cache line is not locked during execution of the second atomic operation or writing of the second result to the cache line.

In Example 30, the subject matter of any of Examples 23-29, wherein the operations comprise: obtaining a credit from an arbiter of the results queue; and executing, in response to receiving the credit, the atomic operation to produce the result.

In Example 31, the subject matter of Example 30, wherein the operations comprise: receiving a second atomic operation at the memory device; detecting that a second run length of the second atomic operation is beyond the threshold; attempting to receive a second credit from the arbiter for the second atomic operation; and refraining from starting execution of the second atomic operation upon failing to obtain the second credit from the arbiter.

In Example 32, the subject matter of any of Examples 30-31, wherein total credits available from the arbiter are equal to a number of entries available in the results queue.

In Example 33, the subject matter of any of Examples 30-32, wherein the operations comprise returning the credit to the arbiter upon receipt of the results after dequeuing from the results queue.

Example 34 is a system for variable execution time atomic operations, the system comprising: means for receiving an atomic operation at a memory device, the atomic operation corresponding to an operation to be performed on memory in the memory device; means for detecting that a run length of the atomic operation beyond a threshold; means for locking a cache line for the memory in response to detecting that the run length is beyond the threshold; means for enqueueing a result of the atomic operation in a results queue; means for writing the cache line with the result in response to dequeuing the result from the results queue; and means for unlocking the cache line in response to writing the cache line with the result.

In Example 35, the subject matter of Example 34, wherein the means for locking the cache line includes means for setting a tag for the cache line.

In Example 36, the subject matter of Example 35, wherein the tag indicates that an atomic operation is pending.

In Example 37, the subject matter of Example 36, wherein the tag is a bit at an index that corresponds to a pending atomic operation.

In Example 38, the subject matter of any of Examples 34-37, wherein the run length is measured in clock cycles.

In Example 39, the subject matter of Example 38, wherein the threshold is a single clock cycle.

In Example 40, the subject matter of any of Examples 34-39, comprising: means for receiving a second atomic operation at the memory device; means for detecting that a second run length of the second atomic operation is not beyond the threshold; means for executing the second atomic operation to produce a second result; and means for writing the second result to the cache line, wherein the cache line is not locked during execution of the second atomic operation or writing of the second result to the cache line.

In Example 41, the subject matter of any of Examples 34-40, comprising: means for obtaining a credit from an arbiter of the results queue; and means for executing, in response to receiving the credit, the atomic operation to produce the result.

In Example 42, the subject matter of Example 41, comprising: means for receiving a second atomic operation at the memory device; means for detecting that a second run length of the second atomic operation is beyond the threshold; means for attempting to receive a second credit from the arbiter for the second atomic operation; and means for refraining from starting execution of the second atomic operation upon failing to obtain the second credit from the arbiter.

In Example 43, the subject matter of any of Examples 41-42, wherein total credits available from the arbiter are equal to a number of entries available in the results queue.

In Example 44, the subject matter of any of Examples 41-43, comprising means for returning the credit to the arbiter upon receipt of the results after dequeuing from the results queue.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A memory controller comprising:
an interface to a cache line; and
processing circuitry configured to:
classify an atomic operation that is received as a long atomic operation;
lock a cache line that corresponds to the long atomic operation based classifying the atomic operation as a long atomic operation; and
unlock the cache line in response to a write of a result from the long atomic operation to the cache line.

2. The memory controller of claim 1, wherein the atomic operation is classified as the long atomic operation based on run length.

3. The memory controller of claim 2, wherein the run length is measured in clock cycles.

4. The memory controller of claim 3, wherein the atomic operation is classified as the long atomic operation based on the clock cycles being greater than a single clock cycle.

5. The memory controller of claim 1, wherein the processing circuitry is configured to:
receive a second atomic operation at the memory controller;
detect that a second run length of the second atomic operation is not beyond a threshold;
execute the second atomic operation to produce a second result; and
write the second result to the cache line, wherein the cache line is not locked during execution of the second atomic operation or writing of the second result to the cache line.

6. The memory controller of claim 1, wherein, to lock the cache line, the processing circuitry is configured to set a tag for the cache line.

7. The memory controller of claim 6, wherein the tag indicates that an atomic operation is pending.

8. The memory controller of claim 7, wherein the tag is a bit at an index that corresponds to a pending atomic operation.

9. The memory controller of claim 1, wherein the processing circuitry is configured to:
obtain a credit from an arbiter of a results queue; and
execute, in response to receiving the credit, the atomic operation to produce the result.

10. The memory controller of claim 9, wherein the processing circuitry is configured to:
receive a second atomic operation at the memory controller;
detect that a second run length of the second atomic operation is beyond a threshold;
attempt to receive a second credit from the arbiter for the second atomic operation; and
refrain from starting execution of the second atomic operation upon failing to obtain the second credit from the arbiter.

11. The memory controller of claim 9, wherein total credits available from the arbiter are equal to a number of entries available in the results queue.

12. The memory controller of claim 9, wherein the processing circuitry is configured to return the credit to the arbiter upon receipt of results after dequeuing from the results queue.

13. A non-transitory machine readable medium including instructions that, when executed by processing circuitry of a memory controller, cause the memory controller to perform operations comprising:
classifying an atomic operation that is received as a long atomic operation;
locking a cache line that corresponds to the long atomic operation based classifying the atomic operation as a long atomic operation; and
unlocking the cache line in response to a write of a result from the long atomic operation to the cache line.

14. The non-transitory machine readable medium of claim 13, wherein the atomic operation is classified as the long atomic operation based on run length.

15. The non-transitory machine readable medium of claim 14, wherein the run length is measured in clock cycles.

16. The non-transitory machine readable medium of claim 15, wherein the atomic operation is classified as the long atomic operation based on the clock cycles being greater than a single clock cycle.

17. The non-transitory machine readable medium of claim 13, wherein the operations comprise:
receiving a second atomic operation at the memory controller;
detecting that a second run length of the second atomic operation is not beyond a threshold;
executing the second atomic operation to produce a second result; and
writing the second result to the cache line, wherein the cache line is not locked during execution of the second atomic operation or writing of the second result to the cache line.

18. The non-transitory machine readable medium of claim 13, wherein locking the cache line, the processing circuitry is configured to set a tag for the cache line.

19. The non-transitory machine readable medium of claim 18, wherein the tag indicates that an atomic operation is pending.

20. The non-transitory machine readable medium of claim 19, wherein the tag is a bit at an index that corresponds to a pending atomic operation.

* * * * *